United States Patent
Rieth et al.

[11] Patent Number: 6,134,597
[45] Date of Patent: *Oct. 17, 2000

[54] CRC HASH COMPRESSED SERVER OBJECT IDENTIFIER

[75] Inventors: Paul Francis Rieth, Apalachin; Jeffrey Scott Stevens, Endwell, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,052

[22] Filed: May 28, 1997

[51] Int. Cl.$^7$ .................................................. G06F 15/16
[52] U.S. Cl. ........................... 709/237; 709/217; 709/218
[58] Field of Search .................................... 709/217, 218, 709/219, 247, 208, 209, 223, 237; 395/186, 187.01; 380/4, 25; 711/100, 216; 707/103; 370/254, 255; 705/51, 52, 55, 56; 713/156, 159, 172, 185, 200, 201

[56] References Cited

U.S. PATENT DOCUMENTS

| | | | |
|---|---|---|---|
| 4,588,985 | 5/1986 | Carter et al. | 340/347 DD |
| 4,881,264 | 11/1989 | Merkle | 380/25 |
| 5,018,196 | 5/1991 | Takaragi et al. | 380/30 |
| 5,095,480 | 3/1992 | Fenner | 370/238 |
| 5,210,795 | 5/1993 | Lipner et al. | 380/23 |
| 5,299,263 | 3/1994 | Beller et al. | 380/30 |
| 5,418,854 | 5/1995 | Kaufman et al. | 380/23 |
| 5,475,763 | 12/1995 | Kaufman et al. | 380/30 |
| 5,483,597 | 1/1996 | Stern | 380/30 |
| 5,491,749 | 2/1996 | Rogaway | 380/21 |
| 5,491,752 | 2/1996 | Kaufman et al. | 380/30 |
| 5,497,421 | 3/1996 | Kaufman et al. | 380/23 |
| 5,604,490 | 2/1997 | Blakley, III et al. | 340/825.31 |
| 5,673,317 | 9/1997 | Cooper | 380/23 |
| 5,745,570 | 4/1998 | Voldal | 380/4 |
| 5,751,805 | 5/1998 | Otsuki et al. | 380/4 |
| 5,774,651 | 6/1998 | Akiyama et al. | 713/200 |
| 5,778,068 | 7/1998 | Johnson et al. | 380/25 |
| 5,818,936 | 10/1998 | Mashayekhi | 380/25 |
| 5,832,219 | 11/1998 | Pettus | 709/203 |
| 5,850,449 | 12/1998 | McManis | 380/25 |
| 5,872,915 | 2/1999 | Dykes et al. | 395/188.01 |
| 5,875,296 | 2/1999 | Shi et al. | 395/188.01 |
| 5,892,905 | 4/1999 | Brandt et al. | 713/201 |
| 5,892,946 | 4/1999 | Woster et al. | 709/300 |

OTHER PUBLICATIONS

Ritter, T. "The Great CRC Mystery", Dr. Dodd's Journal, Feb. 1986, pp. 26–33.
Nelson, M. R. "File Verification Using CRC", Dr. Dobb's Journal, May 1992, pp. 64–67.
Ritter, T. "The Great CRC Mystery", Dr. Dobb's Journal, Feb. 1986, pp. 26–33.
Williams, R. N. *A Painless Guide to CRC Error Detection Algorithms*, copyright 1993 by Ross Williams at ftp.adelaide.edu.au/pub/rocksoft/crc_v3.txt. (36 pages).

*Primary Examiner*—Zarni Maung
*Assistant Examiner*—Jason D. Cardone
*Attorney, Agent, or Firm*—Shelley M Beckstrand

[57] ABSTRACT

A system and method for operating a server to authorize client access to server objects based upon compressed object identifiers. A compressed object identifier is generated by CRC hashing a string formed by concatenating a user attribute, a user profile and object identifier, and a key. The resulting compressed object identifier is associated with a client object to form the server object. Thereafter user access to the server object is authorized only upon CRC hashing to the same compressed object identifier from a user request including a user profile and object identifier.

12 Claims, 5 Drawing Sheets

CRC HASH COMPRESSED SERVER OBJECT IDENTIFIER

BACKGROUND OF THE INVENTION

1. Technical Field of the Invention

This invention relates to client/server and similar systems, such as in a TCP/IP or internet environment. In particular, this invention relates to the use of CRC hashing to generate compressed object identified for authorizing client or work station gateway access to server objects.

2. Background Art

Software applications in a client/server or Internet system may require that a local object, such as a data or print file, be uniquely identified as belonging to a particular remote user in order to validate a request from such a remote user to access that object to read, modify or delete it. Using user names (or profile names, or logon names, etc.) is not suitable for that purpose, since user, for example, JSTEVENS on a remote system may not necessarily be the same person as user JSTEVENS on the local system.

Similarly, built-in object security or other system authorization schemes useful for validating requests by local users for access to local objects cannot easily be used for identification or validation purposes of remote users or requesters. Such systems typically require that the user provide both a user name and a password. Using this approach, remote users have been identified as authorized to access a local TCP/IP protocol application by requiring that the remote user send both a user name and password that is known to the local system. These user names and passwords must be stored on the local system.

Further, a software application may tag each local object with a tag used to identify those users authorized to access the object. Typically, the local or remote user must provide a signature that matches the tag in order to access the object. In order to protect objects which are not to be shared, the user signature must not match the signature of any other remote or local user.

In an "open" system, it is desirable that such an object tag be a publicly visible property of the object. This avoids the need to use built-in object security or do other system authorization checking. Built-in object security is normally in contradiction to "open" design. That is, proprietary security mechanisms are generally platform dependent, which defeats the open design objective of creating client/server applications that can interact while the client and server may each be running on a different platform. If the platforms are different, then the built-in security may be different, and to account for all cases of security protocols for the various platforms defeats important objectives of "openness". There is, therefore, a need in the art for a method to tag an object through publicly visible properties, such as file name and profile or other such descriptive properties that can or will be communicated by a remote user in a request to access a local object. There is, also, a need in the art for a tagging protocol that will work within existing communication protocols, that is compliant with existing standards based applications such that the protocol is transparent to the client, where the client need not have knowledge of or specifically participate in the authorization mechanism employed (such as by communicating keys or passwords), and that requires no changes to the many different existing client applications available on many various platforms.

In one important client/server open application, a text field for an operating system definition of a spool file is restricted to a maximum of 10 bytes. There is a need for that text field to contain a unique tag for a user identified by both a TCP/IP address of sixteen bytes and a user profile of ten bytes. In order to preserve the "openness" aspect of that client/server application, whatever is done by the server to accommodate the 10 byte limitation must be transparent to the client. Consequently, there is a need in the art for a client/server system protocol for compressing user identification information into a substantially secure and unique tag in a manner which is transparent to the client.

It is an object of the invention to provide a system for identifying objects with a user unique, compressed tag.

It is a further object of the invention to provide such a user unique, compressed tag in a manner which is transparent to the user.

It is a further object of the invention to provide such a user unique, compressed tag from publicly available information.

SUMMARY OF THE INVENTION

This invention comprises a system and method for operating a server to authorize client access to server objects based upon compressed object identifiers. The method of the invention comprises the steps of generating a compressed object identifier by CRC hashing a string formed by concatenating a user attribute, a user profile and object identifier, and a key; associating the resulting compressed object identifier with a client object to form a server object; and thereafter authorizing user access to the server object only upon CRC hashing to the same compressed object identifier from a user request including a user profile and object identifier.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
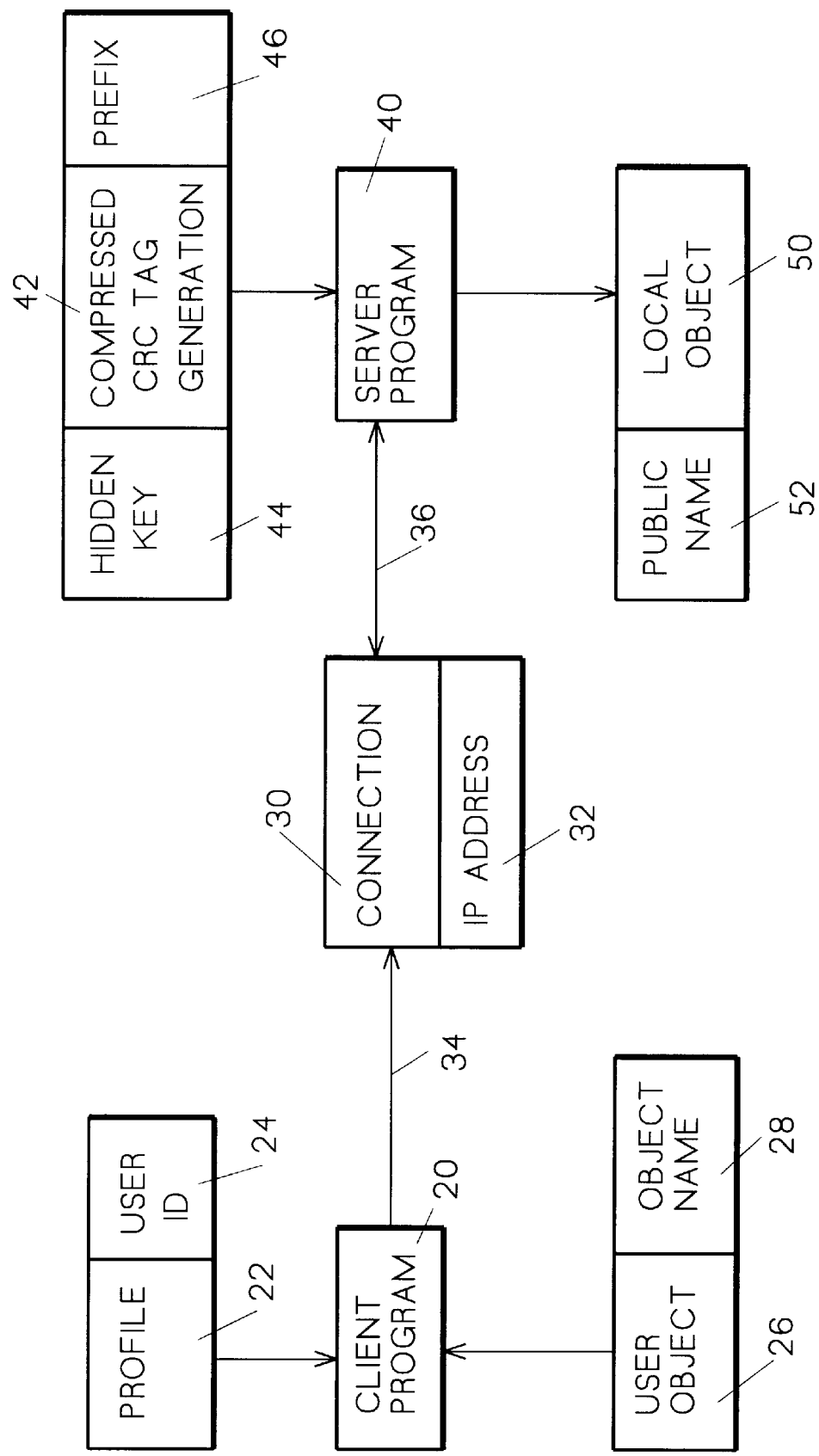
FIG. 1 is conceptual diagram illustrating several programming entities and objects comprising the system of the invention.

In accordance with this invention, a software application tags objects with unique identifiers, such as string of characters or bits, which function as signatures for remote (or local) users. Thus, for example, a remote user must have a signature that matches the tag in order to be authorized to the object. The remote user must also have a signature that does not match any other remote user.

Since it is not desireable to use any built-in object security or do other system authorization checking, the tag must be a publicly visible property of the object. In accordance with this invention, local objects are tagged through its name or description properties.

The software application then validates any remote (or local) user requests to manipulate the object by inspecting the tagged property of the object and comparing it with the request from the user, only those objects which are tagged and have a tag which matches the signature of the remote (or local) user can be manipulated.

Even though the tag is publicly visible, it is generated inside the software application, meaning the formula or mechanism used to create at the tag can be kept private. This means that it cannot be known what property or combination of properties of the remote user were used as keys to create the tag. This is important, because the validation or identification of the remote (or local) user is only successful if the software application can recreate the publicly visible tag using the same combination of properties.

Since the tag is public, it may also be possible for another application or user to mimic or determine the properties used to create the tag, through reverse engineering or deconstruction of the tag. For example, a hacker may attempt to recreate the tag by guessing at the property or combination of properties used. This may even be simple, if the number of properties known about the remote (or local) user is small. If so, then that application or user would be able to pretend to be the originator or creator of objects they did not originate or create.

Therefore, it is desirable to create the tag in such a way as to prevent other applications or users from being able to reverse engineer or deconstruct the tag. This is done by using a Cyclic Redundancy Checking (CRC) hashing of the properties when creating the final publicly visible tag. The CRC hashing mechanism has the additional benefit of creating very small (that is, compressed) tags, which are hard to decode inasmuch as 16-bit CRC hashing gives a 216 or 1-in-65535 chance of a duplicate 4 hexadecimal character tag, and 32-bit CRC hashing gives a 232 or 1-in-4 billion chance with an 8 hexadecimal character tag.

Cyclic Redundancy Checking (CRC) is traditionally used for error detection purposes, primarily for file transfer and communications. The output of a CRC formula is a string of hexadecimal characters or values. In accordance with this invention well-known public CRC formulas for error detection are incorporated into a tag generation tool, thus taking advantage of the CRC ability to create unique tags, in instances where a software application requires each remote (or local) user to have a tag that differs from other users. Various CRC algorithms useful in connection with this invention are described in Ritter, T. "The Great CRC Mystery", *Dr. Dobb's Journal,* February 1986, pp. 26–33; Nelson, M. R. "File Verification Using CRC", *Dr. Dobb's Journal,* May 1992, pp. 64–67; and Williams, R. N. "A Painless Guide to CRC Error Detection Algorithms", copyright 1993 by Ross Williams at ftp.adelaide.edu.au/pub/rocksoft/crc_v3.txt; the teachings of which are incorporated herein by reference.

Referring to FIG. 1, client program 20 is shown in communication with server program 40 over connection 30. The user ID of the user at client program 20 is contained within profile 22. That user has created a user object 26 having user name 28. Server program 40 is operable to create a local object 50 identified by public name 52. Public name 52 is generated by compressed CRC tag generation block 42 from hidden key 44, prefix 46 and IP address 32, as will be explained in more detail hereafter.

Figure 3:
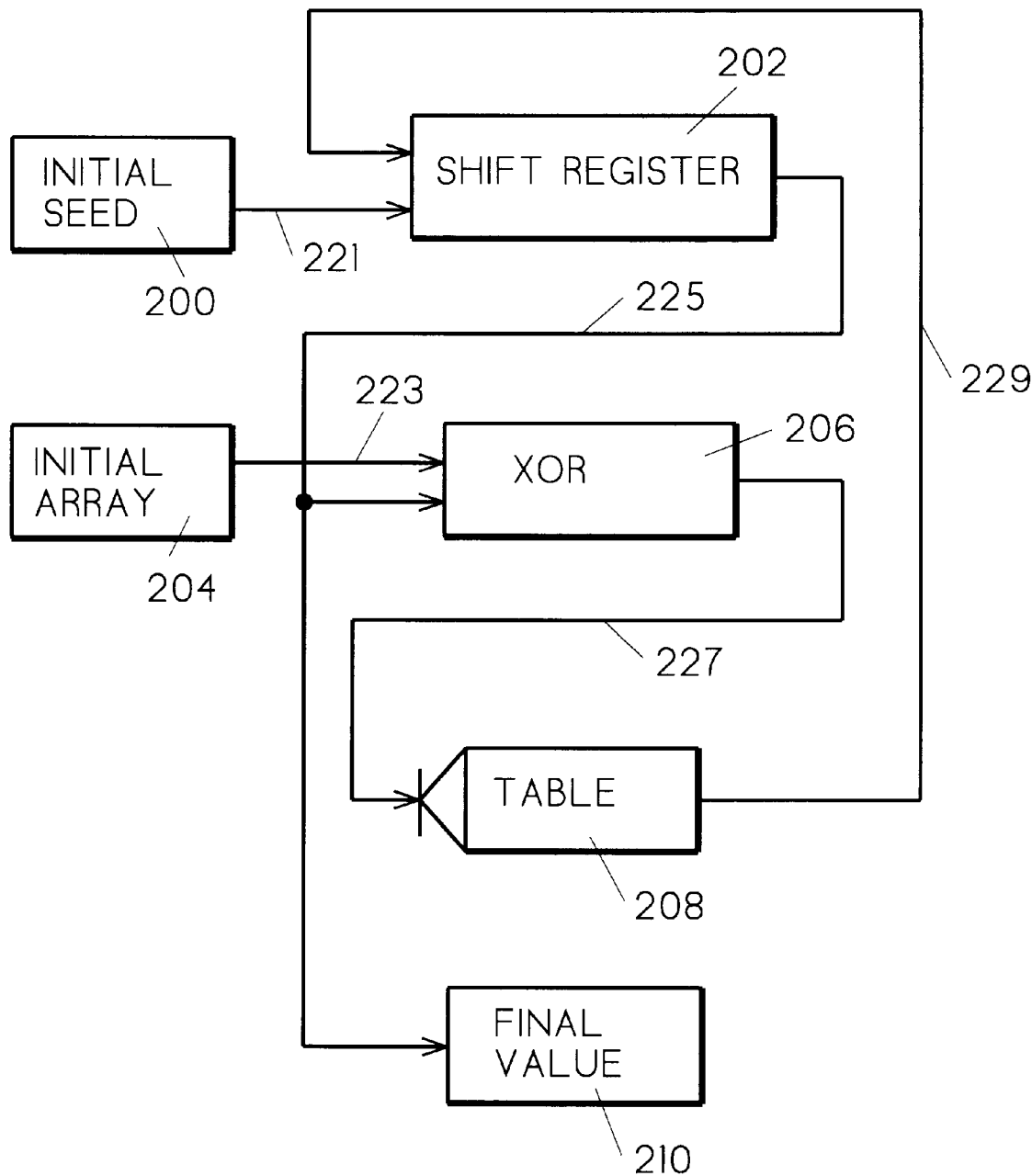
FIG. 3 is a logic flow diagram illustrating a method for generating a compressed CRC tag for identifying and authorizing use of local objects in accordance with a preferred embodiment of the invention.

Referring to FIG. 3, the structure for implementing compressed CRC tag generation block 42 of FIG. 1 is described. Initial seed 200 and initial array 204 feed shift register 202 and XOR block 206, respectively, over lines 221 and 223, respectively. The output of shift register is fed on line 225 to XOR block 206. The output of block 206 is fed on address line 227 to table 208, the output of which is fed on line 229 back to shift register 202. Final value 210 represents the contents of shift register 202 on line 225 at the conclusion of the shift and XOR operations, as will be more fully described hereafter.

Figure 2A:
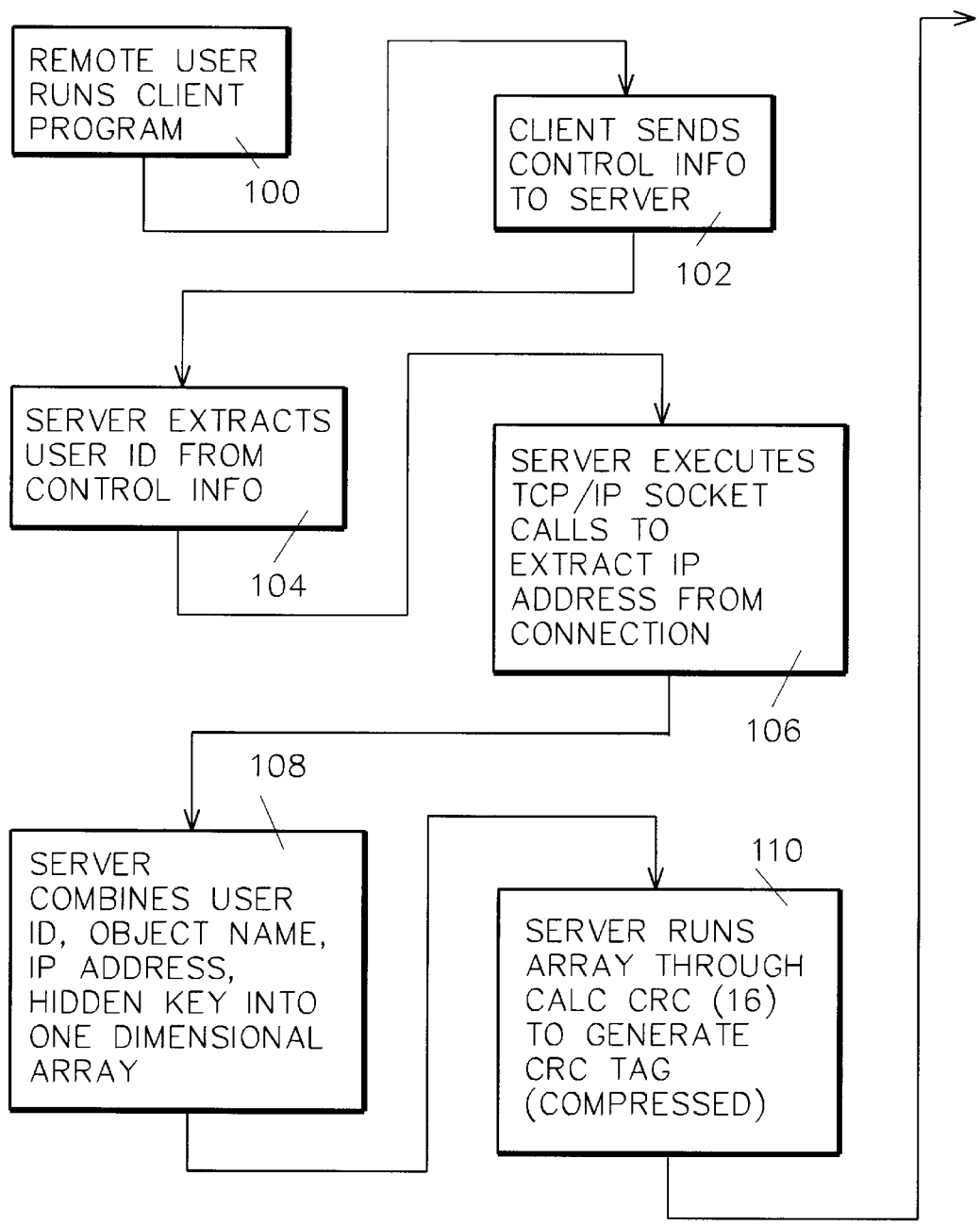
FIG. 2 is a flow diagram illustrating the method steps of the invention.
Figure 2:
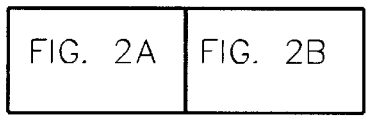
Figure 2B:
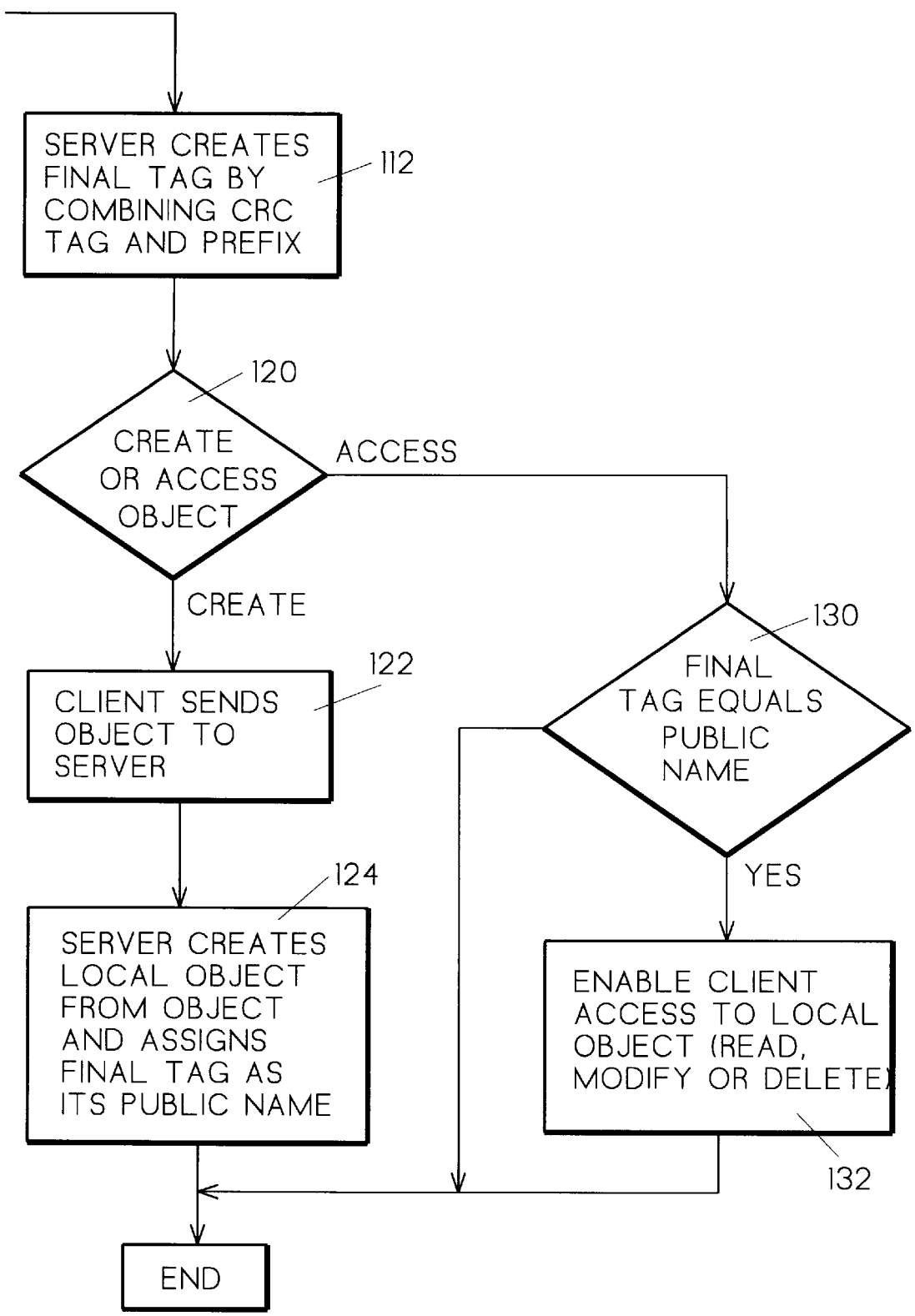

Referring to FIG. 2 in connection with FIGS. 1 and 3, the method of the invention for creating and using a public name 52 for local object 50 will be explained.

In step 100, a remote user runs client program 20 which connects to server 40 through connection 30. By way of example, connection 30 may be via transmission control protocol/internet protocol (TCP/IP) as defined in RFC 793 and 791, respectively, user datagram protocol (UDP) as defined in RFC 768, or the IBM System Network Architecture (SNA).

In step 102, client communicates control information, such as user profile 22 and object name 28, to server 40. ("Profile" and "object name" are some, but not all, of the possibilities for such control information. For example, User ID 24='Jeff Stevens', Object name 28='/afs/endicott.ibm.com/usr2/jstevens/.profile'

In step 104, server 40 extracts user ID 24 from profile 22, which was communicated to it across connection 30 in step 102.

In step 106, in this embodiment using TCP/IP socket calls, server 40 extracts IP address 32 of client 20 from connection 30 (as opposed to client 20 sending this information.) For example, IP Address 32='123.456.789.0'

In step 108, server 40 combines user identifier 24, object name 28, IP address 32 and hidden key 44 into a one-dimensional array (a long string) in a particular order. Hidden key 44 is known only to server 40 so as to prevent deconstruction. An example of hidden key 44 may be: Machine Serial: xxxxxx Model Number: yyyyyyyyy. In this case, the one-dimensional array (also referred to herein as initial array 204) becomes:

'afs/endicott.ibm.com/usr2/'

'jstevens/.profileJeff Stevens'

'Machine Serial: xxxxxx'

'Model Number: yyyyyyyyy123.456.789.0'

In step 110, server 40 runs the array 204 contents thru CRC generator function CalcCRC16() (see FIG. 3), which gives a compressed 2-byte hexadecimal result 210. The result of 16-bit CRC calculations has odds 2**16, or 1-in-65535 chance of users having identical tags. In this example, initial array 204 yields a final value, or CRC tag:

CRC Tag 210=7F9A

In step 112, server 40 combines CRC tag 210 with any final characters desired. For example, if server 40 is a line printer Daemon (LPD), then it may prefix CRC Tag 210=7F9A with prefix 46='LPD' to form public name, or tag, 52. This helps to identify the program or server 40 creating tag 52. In this example, final tag, or public name 52, is:

Final tag 52: LPD7F9A

In step 120, server 40 determines if this request is to receive object 26 from client 20, or to access (read, modify or delete) a previously communicated object.

In step 122, if this request is to communicate a new object, client 20 sends user object 26 over connection 30 to server 40 corresponding to object name 28. In this example, object 28 is named as follows:

'/afs/endicott.ibm.com/usr2/jstevens/.profile'

In step 124, server 40 creates local object 50 with contents from object 26 with object name 28

'/afs/endicott.ibm.com/usr2/jstevens/.profile' and gives it public name 52 of 'LPD7F9A'. This public name 52 may be communicated back to client 20 for use in subsequent requests to access local object 50 (the access leg out of step 120 to step 130.)

In step 130, if this request from client 20 is to access local object 50 to read, modify or delete it, server 40 determines if the final tag created in step 112 the same as the public name 52 associated with a previously created local object 50. In this case, public name 52 may have been communicated from client 20 in connection with this request, or may be determined by searching an array of local objects 50 to compare against their respective public names 52.

If so, in step 132, server 40 executes the action of this request from client 20 with respect to local object 50. Local object 'LPD7F9A' can be manipulated by the same server 40 or any another program that knows the encoding scheme (steps 104 through 112) used by server 40, on behalf of remote user 'Jeff Stevens' at IP Address '123.456.789.0'. Server 40, or any other such program knowing the encoding scheme, may optionally require that the original name of the file with object name 28='/afs/endicott.ibm.com/usr2/jstevens/.profile') be communicated to it by client 20 to finalize authentication.

Referring to FIG. 3, to build in step 110 a CRC tag for use in step 112 to create a final tag, any variation of well-known algorithms for calculating CRC's can be used. These normally involve shift registers which process a one-dimensional array (of variable length) by performing a combination of logical EXCLUSIVE OR, NOT and register shifting operations to randomize an initial seed value.

In this preferred embodiment, to speed this along, a pre-built table 208 of CRC values is used to implement a "quick" method to perform the polynomial equation representing CRC calculations. The CRC signature is calculated using the following polynomial:

$$X^{}16+X^{}15+X^{}13+X^{}7+X^{}4+X^{}2+X+1$$

A CRC is normally generated bit-by-bit. The generation works by shifting into a shift register the XOR of the incoming data bit against the XOR "sum" of selected bits currently in the register. This is repeated for each data bit.

The CRC signature is the register contents when the last data bit is shifted in. For some uses, the resulting value is complemented so that when the CRC value is shifted into the register after the data bits, a known constant signature will be generated IF no data errors were detected. This is used in communications chips that do CRC calculation and so would be typical of communication protocols and disk encoding protocols.

The table look up method is based on the observation that if a data byte is exclusive OR'd (XOR'd) against the appropriate byte of the register, a number in the range of 0–255 is generated. This represents the number of possible changes that a data byte can cause to the register. By storing in a table how the bits in the register must be altered for each of these possibilities, a whole byte's worth of changes are obtained by XOR'ing the changes against the appropriate bits of the register.

Theoretically, a CRC is calculated by "dividing" the CRC polynomial into the number represented by all the data bits appended together. The CRC value is the "remainder". The question of duplicate signatures is equivalent to the question of whether two numbers can have the same remainder. Thus, if the message is less than 64K bits long, the signature ought to be unique. If there are more than 64K bits (8K bytes) then the probability is 1/64K that the remainders will match. If a 32-bit signature is used, this probability drops to approximately to 1-in-4 billion.

To generate the table, a register simulator is fed each of the 256 possible input bytes into an initialized register. The resulting register value (or some modification of it) is then recorded in the table.

Referring now to FIG. 3, in accordance with method step 110 of a preferred embodiment of the invention, the following steps are executed by block 42 to generate CRC compressed tag 210 (which is public name 52 without prefix 46):

1. Initial seed 200 is loaded to shift register 202.
2. One-dimensional array 204 and length of the array are received.
3. The first byte of array 204 is EXCLUSIVE OR'ed in block 206 with the contents the shift register 202 (at this point, it would be initial seed 200).
4. The calculated value on line 227 is used as an offset into pre-built table 208 to acquire a new value, represented by line 229, which is loaded into shift register 202.
5. The next byte of array 204 is EXCLUSIVE OR'ed in block 206 with the contents of shift register 202.
6. Steps 4 and 5 are repeated until the entire length of one-dimensional array 204 is processed in this manner.
7. Final value 210, representing the contents of shift register 202 at the completion of step 6, is the compressed CRC tag.

The resulting compressed tag is the natural output of running a variable length string through the CRC generator. A two-byte (4 character) output results from a 16-bit generator, and a four-byte (8 character) output would result from a 32-bit generator. The CRC tag is the contents of the register after all input characters have been processed.

QTMPLPD is the default owner of the file, but the CRC tag is used for the object name. Thus, LPD7F9A is the name of the created object, which is owned by QTMPLPD because user JSTEVENS does not exist on the target system. If JSTEVENS had existed on the target system, it would be the owner but the object name would still have been LPD7F9A.

By way of example, consider the client/server TCP/IP protocol suite of LPR (Line Printer Requestor) and LPD (Line Printer Daemon). The LPR client 20 can be use to send a printer file 26 from a remote system to an LPD server 40 on a local system. In this example, user JSTEVENS uses an LPR client 20 to send a file to the LPD server 40 on a local system, where the LPD server assigned default owner public name 52=QTMPLPD to the file.

Now, remote user JSTEVENS decides he sent the wrong file 26, and wants to delete the one that was sent. He does not have any of the built-in object authorization on the local system to logon and delete the file himself—it is not even owned by a JSTEVENS user. That is, all that is known by server program 40 is the encoded object name LPD7F9A and the hashing algorithm used to create that name. By this invention, information is stored on the local (server) system necessary to allow JSTEVENS, the real owner of the file, to access and delete it.

In accordance with the invention, the local LPD server (a software application) 40 tags files 50 it creates on the local system. As an example, LPD server 40 may privately use the remote system name 32 REMOTE and remote user name 24 JSTEVENS as keys for CRC hashing. The LPD server 40 then runs both these properties through a well-known CRC hashing formula 42 to arrive at a unique-hexadecimal string of 7F9A, which it uses to name (52) all files it creates to LPD7F9A, on behalf of remote user 24 JSTEVENS on system 32 REMOTE. The CRC output is such that it is impossible to deconstruct that the user name 24 and system name 32 were used as keys.

Now, remote user JSTEVENS on remote system REMOTE uses a client application 20 called LPRM (Line Printer Remove) for the purpose of deleting the file 50 that he created by mistake with the LPR client 20. This request also arrives at the same LPD server 40 on the local system. The LPRM client requests that LPD delete file LPD7F9A. The LPD server application 40 recalculates (42) the CRC value 210 using the private REMOTE 32 and JSTEVENS 24 keys, sees that it matches 7F9A, adds prefix LPD to get final tag (public name) 52 of "LPD7F9A", grants access to all local objects 50 tagged with LPD7F9A and, in response to this request, deletes the file 50. If the CRC value 210 was not 7F9A 52, then the LPD server 40 would reject the request, and not delete the file 50.

Referring to Table 1, a "C" language description of a procedure for building table 208 is set forth. Instead of performing a straightforward caclulation of the 32 bit CRC using a series of logical operations, in accordance with a preferred embodiment of the invention a faster table lookup method is employed. The procedure of Table 1 is called once upon startup to build the table 208 for use later when calculating the CRC values. In this procedure, a 256 entry table is built by taking values from 0, 1, 2 . . . 255 and running them through the CRC calculator, and using the result for value 0 at table offset 0, the result for value 1 at table offset 1, and so forth.

```
13              Table 1: Build CRC Table 208
14   #include <stdio.h>
15   #include <stdlib.h>
16   #include <string.h>
17   #include <sys/types.h>
18   #include <sys/stat.h>
19   unsigned long CRCTable [ 256 ];
20   void BuildCRCTable( );
21   #define CRC32_POLYNOMIAL 0XEDB88320L
22   void BuildCRCTable( )
23   {
24      inj i;
25      int j;
26      unsigned long crc;
27      for ( i = 0; i <= 255; i++ ) {
28          crc = i;
29          for ( j = 8 ; j > 0; j-- ) {
30              if ( crc & 1 )
31                  crc = ( crc >> 1 ) ^ CRC32_POLYNOMIAL;
32              else
33                  crc >>= 1;
34          }
35          CRCTable[i] = crc;
36      }
37   }
     (where ^ represents exclusive OR.)
```

Figure 4:
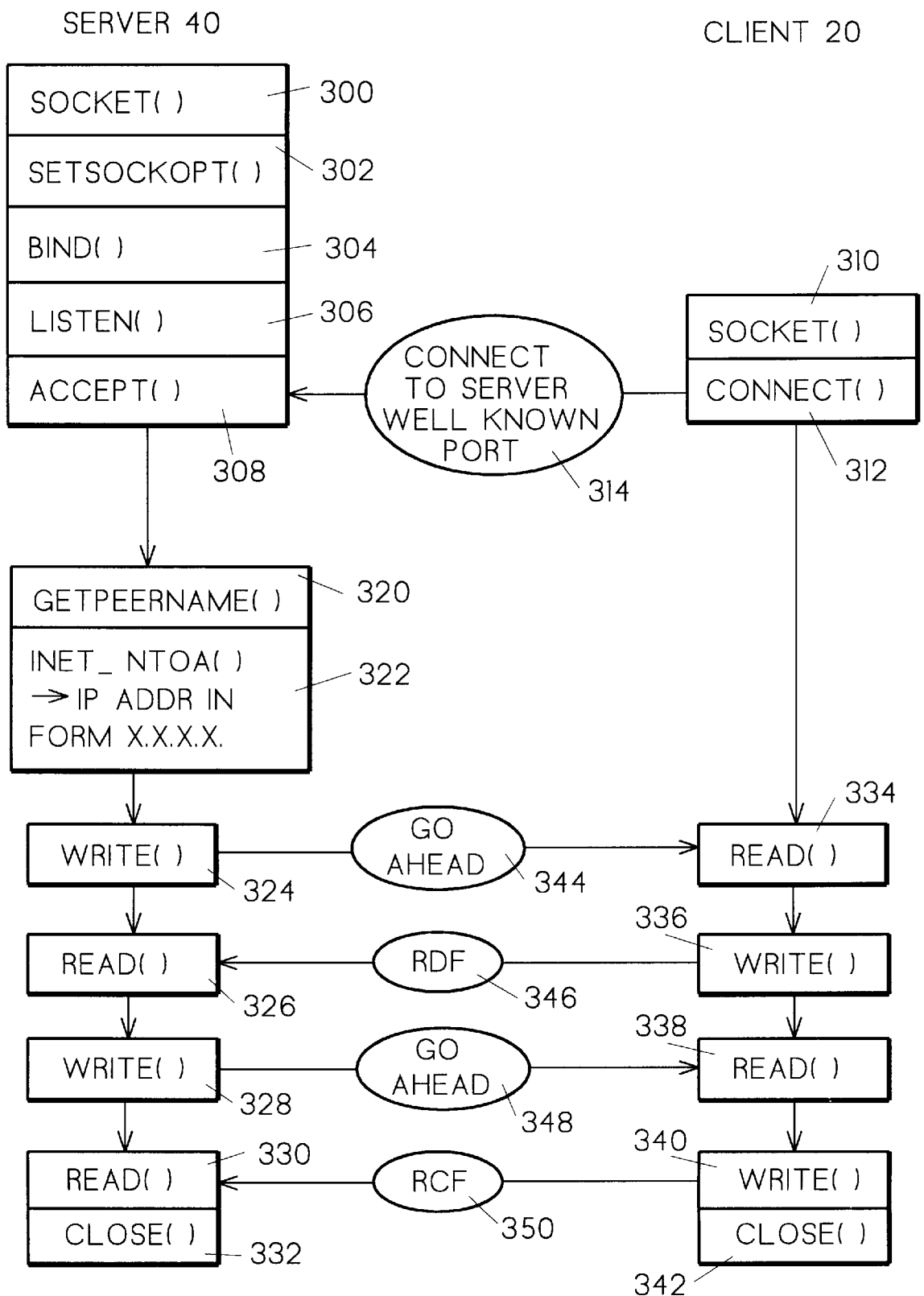
FIG. 4 is a flow chart illustrating a socket program for communications between a server and a client.

Referring to FIG. 4, a socket program for client/server communications is illustrated. In steps 300 through 306, server 40 sets up and listens on a well-known socket port. (RFC 1179 says listen on port 515.)

In step 310, client 20 creates a socket, and in step 312 sends connect message 314 to server 40.

In step 308, server 40 accepts connection request 314, and in step 322 uses a combination of socket calls in getpeername() and inet_ntoa() to read IP address information from active connection 314, and stores it temporarily in a local variable.

In step 324 server 40 sends go ahead command 344 to inform client 20 that it may now send RDF data file information.

In step 334 client 20 accepts the go ahead command 344, and step 336 sends RDF datafile 346 to server 40.

In step 326, server 40 reads RDF data file 346 and stores it temporarily in a buffer, and in step 328 sends go ahead command 348 to inform client 20 that it can now send the RCF control file information.

In step 338, client 20 accepts the go ahead command 348, and in step 340 sends RCF control file 350 to server 40.

In step 328, server 40 accepts the RCF control file 350, reads and processes the information by CRC hasing of the RCF information and IP address to determine the local object name that will be used to identify the RDF data file 346 and creates the local object.

In step 342 client 20 closes the socket connection. In step 332, server 40 closes the socket connection. Server 40 now discards the IP address, RCF and RDF information—which are no longer needed. The socket communication process is complete.

Referring to Tables 2 and 3, an example is given of a usage of the protocols of the preferred embodiment of the invention. In Table 2, files are sent from a client to a server. In Table 3, the contents of the control file sent in the procedure of Table 2 are set forth. In the control file of Table 3, each line is followed by an ASCII LF (not shown).

In this example, client 20 prints one text file, named "somefile". Client 20 is user "jstevens" on host "wormhole.endicott.ibm.com" and the printer queue is on "server.ibm.com". The printer is named "jeffsprt". In the tables, the string <XX> represents the octal byte code or ASCII abbreviation for a single character. Before sending the job, client 20 must assign a job number; in this example, that is "1123".

| 1  | TABLE 2: SENDING THE FILES | |
|---|---|---|
| 2  | CLIENT SENDS | SERVER REPLIES |
| 3  | ------------------------------ | -------------------- |
| 4  | <02>jeffsprt<LF> | |
| 5  | | Receive Printer Job |
| 6  | <00> | |
| 7  | <03>1024 dfA123wormhole.endicott.ibm.com<LF> | |
| 8  | | Data File 1 |
| 9  | <00> | |
| 10 | 1024 bytes of data | |
| 11 | <00> | |
| 12 | <00> | |
| 13 | | Second status reply |
| 14 | <02>164 cfA123wormhole.endicott.ibm.com<LF> | |
| 15 | | Control File |
| 16 | <00> | |
| 17 | 164 bytes of data | |
| 18 | <00> | |
| 19 | <00> | |
| 20 | | Second status reply |
| 21 | connection closed | |

TABLE 3

CONTROL FILE CONTENTS

| 1 | Hwormhole.endicott.ibm.com | |
| 2 | Pjstevens | User ID |
| 3 | Jjeffjob | Job Name |
| 4 | CJeff's Job Class | Job Name for Banner |

TABLE 3-continued

CONTROL FILE CONTENTS

| 5 | Lsomebanner | Print Banner Page |
|---|---|---|
| 6 | fdfA123wormhole.endicott.ibm.com | Print file1 |
| 7 | Nsomefile | Source file name |
| 8 | UdfA123wormhole.endicott.ibm.com | Delete first data file |

Advantages Over the Prior Art

It is an advantage of the system and method of the preferred embodiment of this invention a substantially unique and compressed tag is provided for a local object without storing a local user name or password. Further, since sensitive information is not passed across a network between a client and server, security exposures that exist in Telnet or FTP type TCP/IP applications are substantially reduced.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for generating a compressed file name at a server at session initialization in response to an initial request from a user in anticipation of a subsequent request to use, delete or alter the named file and for responding to said subsequent request, the method comprising the steps of:

storing at said server a user attribute, and a hidden key value;

communicating said initial request from said user to said server, said initial request including a file name, a user profile and file data;

operating said server, responsive to said initial request and without reference to any prompting for user assigned credentials, according to the steps of:
      building a first input string, said first input string including the user profile from said initial request, said user attribute and said hidden key value;
      hashing said first input string to generate a first tag;
      concatenating said first tag with a fixed identifier to generate a first file name for said file data; and
      storing said file data identified by said first file name;

communicating said subsequent request from said user to said server, said subsequent request including said user profile, said file name, and a file command; and operating said server at session initialization and without reference to any user prompting, responsive to said subsequent request, according to the steps of:
      building a second input string, said second input string including the user profile from said subsequent request, said user attribute, and said hidden key;
      hashing said second input string to generate a second tag;
      concatenating said second tag with said fixed identifier to generate a second file name;
      comparing said second file name to said first file name and, if equal, executing said file command with respect to the file identified by said first file name.

2. Method for operating a server to create and operate upon files identified by compressed file identifiers in a manner transparent to standards based programs, comprising the steps of:

a) without prompting for user assigned credentials, storing a user attribute for each of a plurality of prospective users;

b) responsive to a first user request to create a file, said request including a first file name, a first user profile and file data:
      selecting a first user attribute corresponding to said user profile;
      building at session initialization a first input string derived from characteristics of said session without user prompting, said first input string including said first user profile and said first file name, said first user attribute and a hidden key value;
      hashing and compressing said first input string to generate a first compressed tag;
      concatenating said first compressed tag with a fixed identifier to generate a first compressed file identifier for said file data; and
      storing said file data associated with said first compressed file identifier;

c) repeating step (b) for each of a plurality of first user requests, building thereby a collection of first compressed file identifiers;

d) responsive to a second user request, said second user request including a second user profile, a second file name, and a file command:
      selecting a second user attribute corresponding to said second user profile;
      building at session initialization before any prompting for user assigned credentials a second input string, said second input string including said second user profile, said second file name, said second user attribute, and said hidden key;
      hashing and compressing said second input string to generate a second compressed tag;
      concatenating said second compressed tag with said fixed identifier to generate a second compressed file identifier; and
      locating from among said collection of first compressed file identifiers a compressed file identifier which corresponds to said second compressed file identifier and, if located, executing said file command with respect to the file corresponding to the located first compressed file identifier.

3. Method for operating a server, comprising the steps of:

a) storing a user attribute for each of a plurality of prospective users;

b) responsive to a first user request to create a file, said request including a first file name, a first user profile and file data:
      selecting a first user attribute corresponding to said user profile;
      based on session connection characteristics, dynamically building at session connection time a first input string, said first input string including said first user profile and said first file name, said first user attribute and a hidden key value;
      hashing said first input string to generate a first tag;
      concatenating said first tag with a fixed identifier to generate a first file identifier for said file data; and storing said file data associated with said first file identifier;

c) repeating step (b) at session connection time for each of a plurality of first user requests, building thereby a collection of first file identifiers;

d) responsive to a second user request, said second user request including a second user profile, a second file name, and a file command but no said first tag:

selecting a second user attribute corresponding to said second user profile;

dynamically building at session connection time entirely from session connection characteristics without user prompting a second input string, said second input string including said second user profile, said second file name, said second user attribute, and said hidden key;

hashing said second input string to generate a second tag;

concatenating said second tag with said fixed identifier to generate a second file identifier; and locating from among said collection of first file identifiers a file identifier which corresponds to said second file identifier and, if located, executing said file command with respect to the file corresponding to the located first file identifier.

4. Method for operating a server to authorize client access to server objects based upon compressed object identifiers in a manner transparent to standards based programs, comprising the steps of:

receiving a client object and a first client profile;

determining a first client attribute corresponding to said first client profile;

at session connection time, CRC hashing a string formed from session connection characteristics including said first client profile, said first client attribute, and a hidden key to generate without user prompting a first compressed object identifier;

associating said compressed object identifier with said client object to form a corresponding server object;

receiving a request from a client for access to said server object, said request including a subsequent client profile and an object command but not said first compressed object identifier;

determining from said subsequent client profile a corresponding second client attribute;

CRC hashing a string formed from session connection characteristics including said subsequent client profile, said second client attribute, and said hidden key to generate a second compressed object identifier; and determining if said second compressed object identifier compares with a said first compressed object identifier and only if so, executing said object command with respect to said corresponding server object.

5. Method for operating a server to create and operate upon a user file associated with a user unique file identifier without prompting for user supplied indicia and thus in a manner transparent to standards based programs, comprising the steps of:

storing a user attribute for each of a plurality of prospective users;

during session initialization responsive to a first user request to create a file, said request including a first file name, a first user profile and file data:

selecting a first user attribute corresponding to said user profile;

building a first input string, said first input string including said first user profile and said first file name, said first user attribute and a hidden key value;

hashing said first input string to generate a first tag;

concatenating said first tag with a fixed identifier to generate a first file identifier for said file data; and storing said file data associated with said first file identifier; and during session initialization responsive to a second user request, said second user request including a second user profile, a second file name, and a file command:

selecting a second user attribute corresponding to said second user profile;

building a second input string, said second input string including said second user profile, said second file name, said second user attribute, and said hidden key value;

hashing said second input string to generate a second tag;

concatenating said second tag with said fixed identifier to generate a second file identifier; and comparing said second file identifier to said first file identifier and, if equal, executing said file command with respect to the file identified by said first file identifier.

6. Method for operating a server to authorize client access to server objects based upon compressed object identifiers obtained in a manner transparent to standards based programs without prompting for user assigned credentials, comprising the steps of:

dynamically generating at said server at session connection time a compressed object identifier based entirely on session connection characteristics without said prompting by CRC hashing a string formed by concatenating server object identifiers including a user attribute, a user profile and object identifier, and a hidden key;

associating said compressed object identifier with a client object not previously including said compressed object identifier to form a server object; and thereafter authorizing user access to the server object without said prompting only upon CRC hashing to the same compressed object identifier from a user request including a user profile and object identifier concatenated with a corresponding user attribute and said hidden key.

7. A server system for authorizing client access to server objects based upon compressed object identifiers, comprising:

means for generating without reference to any prompting for user supplied credentials a compressed object identifier by CRC hashing a string formed by concatenating a user attribute, a user profile and object identifier, and a hidden key derived from current session characteristics without user prompting;

means for associating said compressed object identifier with a client object to form a server object; and means for thereafter authorizing user access to the server object only upon CRC hashing without reference to any prompting for user supplied credentials to the same compressed object identifier from a user request including a user profile and object identifier concatenated with a corresponding user attribute and said key.

8. An article of manufacture comprising a computer usable medium having computer readable program code means embodied therein for causing a server to authorize client access to server objects based upon compressed object identifiers without reference to any prompting for user assigned credentials, the computer readable program means in said article of manufacture comprising:

computer readable program code means for causing a computer to effect generating at session start time a compressed object identifier by CRC hashing a string formed by concatenating a user attribute, a user profile and object identifier, and a hidden key;

computer readable program code means for causing a computer to effect associating said compressed object identifier with a client object to form a server object; and computer readable program code means for causing a computer to thereafter effect authorizing user access to the server object only upon CRC hashing to the same compressed object identifier without prompting for a user assigned credential from a user request including a user profile and object identifier concatenating with a corresponding user attribute and said hidden key.

9. A program storage device readable by a machine, tangibly embodying a program of instructions executable by a machine to perform method steps for causing a server to authorize client access to server objects based upon compressed object identifiers in a manner transparent to standards based programs and without reference to any prompting to user assigned credentials, said method steps comprising:

dynamically generating at session connection time a compressed object identifier by CRC hashing a string formed from session connection characteristics exclusive of any prompting for user supplied credentials by concatenating a user attribute, a user profile and object identifier, and a hidden key;

associating said compressed object identifier with a client object to form a server object; and thereafter authorizing user access to the server object only upon CRC hashing to the same compressed object identifier from a user request including a user profile and object identifier concatenated with a corresponding user attribute and said hidden key.

10. An internet site providing validation of access requests from a remote server to a local server in accordance with existing standards based protocols, comprising:

means for generating at session connection time a compressed object identifier by CRC hashing a string formed without reference to any prompting for user assigned credentials by concatenating server object identifiers including a user attribute, a user profile and object identifier, and a hidden key;

means for associating said compressed object identifier with a client object to form a server object; and means for thereafter authorizing user access to the server object only upon CRC hashing at session connection time to the same compressed object identifier from a user request including a user profile and object identifier concatenated with a corresponding user attribute and said hidden key.

11. An e-Business process for uniquely validating an access request from a remote server to a local server in accordance with existing standards based protocols in an internet environment, comprising the steps of:

generating a compressed object identifier in a manner transparent to said existing standards based protocols by CRC hashing without reference to any prompting for user assigned credentials a string formed by concatenating server object identifiers including a user attribute, a user profile and object identifier, and a hidden key;

associating said compressed object identifier with a client object not previously including said compressed object identifier to form a server object; and thereafter authorizing user access to the server object only upon CRC hashing to the same compressed object identifier from a user request including a user profile and object identifier concatenated with a corresponding user attribute and said hidden key.

12. A computer program product or computer program element, readable by a machine, tangibly embodying a program of instructions executable by a machine to perform method steps for causing a server to authorize client access to server objects based upon compressed server object identifiers without reference to any prompting for a user identifier, said method steps comprising:

generating a compressed object identifier by CRC hashing a string formed by concatenating a user attribute, a user profile and object identifier, and a hidden key derived exclusively from current session characteristics without user prompting;

associating said compressed object identifier with a client object to form a server object; and thereafter authorizing user access to the server object only upon CRC hashing to the same compressed object identifier from a user request including a user profile and object identifier concatenated with a corresponding user attribute and said key.

\* \* \* \* \*